US012807791B2

(12) United States Patent
Shao et al.

(10) Patent No.: US 12,807,791 B2
(45) Date of Patent: Nov. 24, 2026

(54) PREPARATION METHOD OF BROAD BEAN PROTEIN AND STARCH-BASED FOAMED HYDROGEL, AND USE THEREOF IN PREPARATION OF VIBRATION-DAMPING PACKAGING

(71) Applicant: NINGBO UNIVERSITY, Zhejiang (CN)

(72) Inventors: Xingfeng Shao, Zhejiang (CN); Meng Li, Zhejiang (CN); Yingying Wei, Zhejiang (CN); Chenjun Shi, Zhejiang (CN); Jianfen Ye, Zhejiang (CN); Shu Jiang, Zhejiang (CN); Yi Chen, Zhejiang (CN)

(73) Assignee: NINGO UNIVERSITY, Zhejiang (CN)

( * ) Notice: Subject to any disclaimer, the term of this patent is extended or adjusted under 35 U.S.C. 154(b) by 0 days.

(21) Appl. No.: 19/359,595

(22) Filed: Oct. 15, 2025

(65) Prior Publication Data

US 2026/0109839 A1 Apr. 23, 2026

(30) Foreign Application Priority Data

Oct. 23, 2024 (CN) ......................... 202411479920.6

(51) Int. Cl.
*A61B 17/16* (2006.01)
*A61B 17/00* (2006.01)
(Continued)

(52) U.S. Cl.
CPC .............. *C08L 3/00* (2013.01); *B65D 81/113* (2013.01); *C08J 3/11* (2013.01); *C08J 9/0061* (2013.01);
(Continued)

(58) Field of Classification Search
None
See application file for complete search history.

(56) References Cited

U.S. PATENT DOCUMENTS 5,272,181 A * 12/1993 Boehmer ................. C08J 9/125
521/149
5,922,379 A * 7/1999 Wang ...................... B29B 7/007
106/162.51
(Continued)

FOREIGN PATENT DOCUMENTS

CN 115260772 11/2022
CN 115260772 A * 11/2022 ............ C08J 9/0028
CN 117624646 3/2024

*Primary Examiner* — Tanzim Imam
(74) *Attorney, Agent, or Firm* — JCIPRNET

(57) ABSTRACT

The present disclosure provides a preparation method of a broad bean protein and starch-based foamed hydrogel, and a use thereof in preparation of a vibration-damping packaging. The preparation method includes the following steps: stirring a broad bean protein solution with a concentration of 40 g/L to 60 g/L until foaming; under stirring, adding a sodium alginate-starch mixed solution in a volume twice a volume of the broad bean protein solution, followed by stirring until homogeneous; and adding calcium carbonate until a final concentration of the calcium carbonate reaches 10 g/L to 12 g/L, and further stirring thoroughly to produce the broad bean protein and starch-based foamed hydrogel, where in the sodium alginate-starch mixed solution, a concentration of sodium alginate is 22.5 g/L to 27.5 g/L, and a concentration of corn starch is 120 g/L to 160 g/L.

4 Claims, 18 Drawing Sheets
(10 of 18 Drawing Sheet(s) Filed in Color)

(51) Int. Cl.

| | |
|---|---|
| ***A61B 17/88*** | (2006.01) |
| ***B65D 81/113*** | (2006.01) |
| ***C08J 3/11*** | (2006.01) |
| ***C08J 9/00*** | (2006.01) |
| ***C08J 9/30*** | (2006.01) |
| ***C08L 3/00*** | (2006.01) |

(52) U.S. Cl.

CPC ............... *C08J 9/0066* (2013.01); *C08J 9/30* (2013.01); *B65D 2581/056* (2013.01); *C08J 2303/00* (2013.01); *C08J 2405/04* (2013.01); *C08J 2489/00* (2013.01); *C08L 2203/14* (2013.01); *C08L 2205/03* (2013.01)

(56) References Cited

U.S. PATENT DOCUMENTS

| | | | | |
|---|---|---|---|---|
| 2006/0065159 | A1* | 3/2006 | Oyasato | C08L 89/06 106/144.1 |
| 2010/0055184 | A1* | 3/2010 | Zeitels | A61L 27/50 536/55.1 |
| 2020/0009256 | A1* | 1/2020 | Langer | A61K 49/0054 |
| 2020/0146980 | A1* | 5/2020 | Simon | A61K 31/734 |

* cited by examiner

PREPARATION METHOD OF BROAD BEAN PROTEIN AND STARCH-BASED FOAMED HYDROGEL, AND USE THEREOF IN PREPARATION OF VIBRATION-DAMPING PACKAGING

CROSS-REFERENCE TO RELATED APPLICATION

This application claims the priority benefit of China application serial no. 202411479920.6, filed on Oct. 23, 2024. The entirety of the above-mentioned patent application is hereby incorporated by reference herein and made a part of this specification.

TECHNICAL FIELD

The present disclosure belongs to the technical field of food packaging materials, and particularly relates to a preparation method of a broad bean protein and starch-based foamed hydrogel, and a use thereof in preparation of a vibration-damping packaging.

BACKGROUND OF RELATED ART

Fruits serve as an essential source of nutrition in daily diets. The freshness and appearance fruits directly affect the purchasing choices of consumers. During postharvest transportation, fruits are highly susceptible to mechanical damage, which can severely affect the quality of fruits. For example, honey peaches are highly favored by consumers due to softness, juiciness, delicate taste, and rich nutrients. The skin of honey peaches is thin, and offers almost no protective function. As a result, honey peaches are particularly susceptible to mechanical damage during logistics transportation. The mechanical damage makes it easier for pathogens infection to cause postharvest decay, thereby resulting in economic losses. Thus, the development of effective shock-absorbing transport packaging materials has become crucial to extend the shelf life for fruits and reduce the loss of fruits during transportation. The traditional shock-absorbing transport packaging materials, such as foam boxes, plastic crates, corrugated cardboard boxes, and wooden crates, can play a specified protective role for fruits, but provides a limited vibration-damping effect. Additionally, these traditional packaging materials have rough surfaces causing large frictions, which can easily lead to fruit damage. More importantly, these materials are non-biodegradable and contribute to environmental pollution. Therefore, there is an urgent need to develop an optimized vibration-damping transport packaging material to enhance the protection for fruits and reduce the environmental impact.

SUMMARY OF THE INVENTION

The technical problem to be solved by the present disclosure is to provide a preparation method of a broad bean protein and starch-based foamed hydrogel that possesses vibration-damping, moisture-retention, and cold-retaining functions and is biodegradable, and a use thereof in preparation of a vibration-damping packaging. The vibration-damping packaging can play a significant vibration-damping role during logistics transportation, and can remarkably reduce the loss of fruits and vegetables during transportation.

In order to solve the above technical problem, the present disclosure adopts the following technical solutions. The present disclosure provides a preparation method of a broad bean protein and starch-based foamed hydrogel, including the following steps: stirring a broad bean protein solution with a concentration of 40 g/L to 60 g/L until foaming; under stirring, adding a sodium alginate-starch mixed solution in a volume twice a volume of the broad bean protein solution, followed by stirring until homogeneous; and adding calcium carbonate until a final concentration of the calcium carbonate reaches 10 g/L to 12 g/L, and further stirring thoroughly to produce the broad bean protein and starch-based foamed hydrogel, where in the sodium alginate-starch mixed solution, a concentration of sodium alginate is 22.5 g/L to 27.5 g/L and a concentration of corn starch is 120 g/L to 160 g/L.

Further, the broad bean protein solution is prepared by dissolving a broad bean protein in purified water, performing an ultrasonic treatment for 5 minutes to 15 minutes, and adding gluconolactone in a proportion of 2.5% to 3% based on a mass of the purified water, to produce the broad bean protein solution with the concentration of 40 g/L to 60 g/L.

Further, the sodium alginate-starch mixed solution is prepared by dissolving the sodium alginate in purified water to produce a sodium alginate aqueous solution; adding the corn starch to the sodium alginate aqueous solution and thoroughly mixing to obtain a mixture; and heating the mixture in a water bath at 55° C. to 60° C. under stirring for 25 minutes to 35 minutes to produce the sodium alginate-starch mixed solution, where in the sodium alginate-starch mixed solution, the concentration of the sodium alginate is 22.5 g/L to 27.5 g/L, and the concentration of the corn starch is 120 g/L to 160 g/L.

Preferably, the preparation method includes: stirring the broad bean protein solution with a concentration of 60 g/L until foaming; under stirring, adding the sodium alginate-starch mixed solution in the volume twice the volume of the broad bean protein solution, followed by stirring until homogeneous; and adding the calcium carbonate until the final concentration of the calcium carbonate reaches 10 g/L, and further stirring thoroughly to produce the broad bean protein and starch-based foamed hydrogel, where in the sodium alginate-starch mixed solution, the concentration of the sodium alginate is 25 g/L, and the concentration of the corn starch is 140 g/L.

The present disclosure also provides a use of the broad bean protein and starch-based foamed hydrogel described above in preparation of a vibration-damping packaging, including: pouring the broad bean protein and starch-based foamed hydrogel into a mold, allowing the mold to stand for 5 hours, and demolding to produce the vibration-damping packaging based on the broad bean protein and starch-based foamed hydrogel.

Compared with the prior art, the present disclosure has the following advantages.

1. The broad bean protein and starch-based foamed hydrogel of the present disclosure exhibits outstanding energy absorption and dispersion ability, and excellent elasticity and recoverability. When subjected to external impacts or vibrations during transportation, the energy is effectively distributed throughout the material to significantly reduce the shock energy transmitted to an object protected by the material, thereby achieving a vibration-damping effect.
2. The broad bean protein and starch-based foamed hydrogel of the present disclosure possesses a moisture-retention ability. There is a substantial amount of water in the foamed hydrogel, such that a humidity in a packaging can be maintained in a desired range to prevent fruits from quality degradation due to water loss.

3. The broad bean protein and starch-based foamed hydrogel of the present disclosure can play a cold-retaining role to achieve a preservation effect. During the refrigerated transportation of fruits, the foamed hydrogel packaging exhibits a cold-retaining ability, and can maintain a low temperature for a specified period of time even when taken out of a refrigeration environment, thereby extending a preservation period for the fruits.
4. The broad bean protein and starch-based foamed hydrogel of the present disclosure has a smooth surface with a small friction. The hydrophilicity of the foamed hydrogel and the formation of a lubricating layer on a surface of the foamed hydrogel result in the excellent lubricity of the surface of the foamed hydrogel. This lubricity is conducive to reducing the friction and abrasion between a fruit and the packaging.
5. The broad bean protein and starch-based foamed hydrogel of the present disclosure demonstrates excellent biocompatibility and environmental friendliness. The foamed hydrogel material is safe and non-toxic to the human body. Moreover, raw materials adopted in the preparation of the foamed hydrogel material are eco-friendly and readily degradable, which guarantees the environmental friendliness and no pollution of the product.

In summary, the present disclosure provides a preparation method of a broad bean protein and starch-based foamed hydrogel, and a use of the broad bean protein and starch-based foamed hydrogel in preparation of a vibration-damping packaging. A three-dimensional crosslinked hydrophilic polymer network structure of the hydrogel material can rapidly deform and absorb lots of energy. When the foamed hydrogel undergoes external impacts and vibrations, the energy can be effectively dispersed throughout the material to significantly reduce the shock energy transmitted to an object protected by the material, thereby achieving a vibration-damping effect. The foamed hydrogel exhibits excellent biocompatibility. Additionally, raw materials for producing the foamed hydrogel are eco-friendly and readily degradable, and are safe and non-toxic to the human body, ensuring the environmental friendliness and no pollution of the packaging, and eliminating an environmental burden.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5A shows an image of a foamed hydrogel sample, and FIG. 5B shows an image of a foamed hydrogel packaging, with honey peaches packaged therein.

FIG. 7A shows honey peaches packaged with the foamed hydrogel, and FIG. 7B shows honey peaches packaged with an expanded polyethylene foam.

FIG. 9A shows honey peaches packaged with the foamed hydrogel, and FIG. 9B shows honey peaches packaged with an expanded polyethylene foam.

FIG. 11A shows honey peaches packaged with the foamed hydrogel, and FIG. 11B shows honey peaches packaged with an expanded polyethylene foam.

DETAILED DESCRIPTION OF THE EMBODIMENTS

Figure 1:
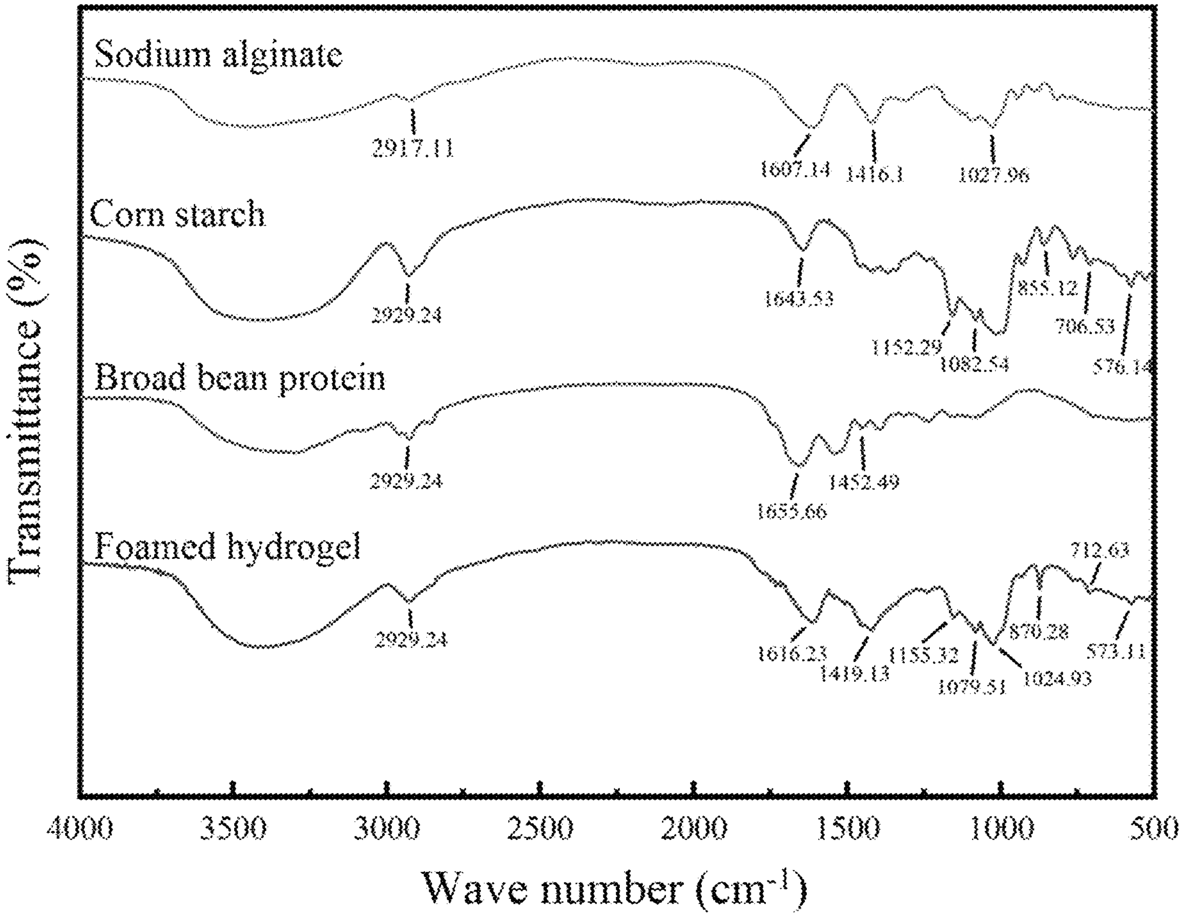
FIG. 1 shows Fourier transform infrared spectroscopy (FTIR) spectra of a foamed hydrogel and components thereof, including sodium alginate, corn starch, and a broad bean protein.

The present disclosure will be described in further detail below with reference to the accompanying drawings and examples.

1. Specific Examples

Example 1: A preparation method of a broad bean protein and starch-based foamed hydrogel was provided, including the following steps:

Step 1: 18 g of a broad bean protein was dissolved in 300 mL of purified water, an ultrasonic treatment was performed for 10 minutes, and 8 g of gluconolactone was added to produce a broad bean protein solution.

Step 2: 15 g of sodium alginate was dissolved in 600 mL of purified water to produce a sodium alginate aqueous solution. 84 g of corn starch was added to the sodium alginate aqueous solution. A resulting mixture was thoroughly mixed, and heated in a water bath at 55° C. to 60° C. for 30 minutes under continuous stirring to produce a sodium alginate-starch mixed solution.

Step 3: The broad bean protein solution was stirred until foaming. The sodium alginate-starch mixed solution was then added under stirring, followed by stirring until homogeneous. 9 g of calcium carbonate was added, and stirring was further performed fully to produce the broad bean protein and starch-based foamed hydrogel.

Example 2: A preparation method of a broad bean protein and starch-based foamed hydrogel was provided, including the following steps:

Step 1: 12 g of a broad bean protein was dissolved in 300 mL of purified water, an ultrasonic treatment was performed for 10 minutes, and 7.5 g of gluconolactone was added to produce a broad bean protein solution.

Step 2: 13.5 g of sodium alginate was dissolved in 600 mL of purified water to produce a sodium alginate aqueous solution. 72 g of corn starch was added to the sodium alginate aqueous solution. A resulting mixture was thoroughly mixed, and heated in a water bath at 55° C. to 60° C. for 30 minutes under continuous stirring to produce a sodium alginate-starch mixed solution.

Step 3: The broad bean protein solution was stirred until foaming. The sodium alginate-starch mixed solution was then added under stirring, followed by stirring until homogeneous. 9.9 g of calcium carbonate was added, and stirring was further performed fully to produce the broad bean protein and starch-based foamed hydrogel.

Example 3: A preparation method of a broad bean protein and starch-based foamed hydrogel was provided, including the following steps:

Step 1: 15 g of a broad bean protein was dissolved in 300 mL of purified water, an ultrasonic treatment was performed for 10 minutes, and 9 g of gluconolactone was added to produce a broad bean protein solution.

Step 2: 16.5 g of sodium alginate was dissolved in 600 mL of purified water to produce a sodium alginate aqueous solution. 96 g of corn starch was added to the sodium alginate aqueous solution. A resulting mixture was thoroughly mixed, and heated in a water bath at 55° C. to 60° C. for 30 minutes under continuous stirring to produce a sodium alginate-starch mixed solution.

Step 3: The broad bean protein solution was stirred until foaming. The sodium alginate-starch mixed solution was then added under stirring, followed by stirring until homogeneous. 10.8 g of calcium carbonate was added, and stirring was further performed fully to produce the broad bean protein and starch-based foamed hydrogel.

2. Analysis of Experimental Results

1) Formation mechanism of a foamed hydrogel: Sodium alginate, corn starch, a broad bean protein, and the foamed hydrogel were each subjected to FTIR analysis. According to the FTIR results in FIG. 1, in an FTIR spectrum of the sodium alginate, peaks at 1,416.1 $cm^{-1}$ and 1,607.14 $cm^{-1}$ correspond to symmetric and asymmetric stretching vibrations of the —COO-group, respectively, and a peak at 1,027.96 $cm^{-1}$ corresponds to a stretching vibration of the C—O bond.

In an FTIR spectrum of the corn starch, a peak at 2,929.24 $cm^{-1}$ corresponds to a stretching vibration of the C—H bond, a peak at 1,643.53 $cm^{-1}$ corresponds to an asymmetric stretching vibration of the —COO-group, peaks at 1,152.29 $cm^{-1}$ and 1,082.54 $cm^{-1}$ correspond to stretching vibrations of the C—O bond, and peaks at 855.12 $cm^{-1}$ and 706.53 $cm^{-1}$ correspond to bending vibrations of the C—H bond. In an FTIR spectrum of the broad bean protein, a peak at 2,929.24 $cm^{-1}$ corresponds to a stretching vibration of the C—H bond, and a peak at 1,655.66 $cm^{-1}$ corresponds to an asymmetric stretching vibration of the —COO-group. It can be seen from the comparison of the FTIR spectra of the sodium alginate, corn starch, broad bean protein, and foamed hydrogel that the spectrum of the foamed hydrogel includes the characteristic absorption peaks of these three raw materials, and has no additional characteristic peak. This indicates that the foamed hydrogel is produced from physical crosslinking interactions among these three raw materials without chemical reactions to generate new bonds.

Figure 2:
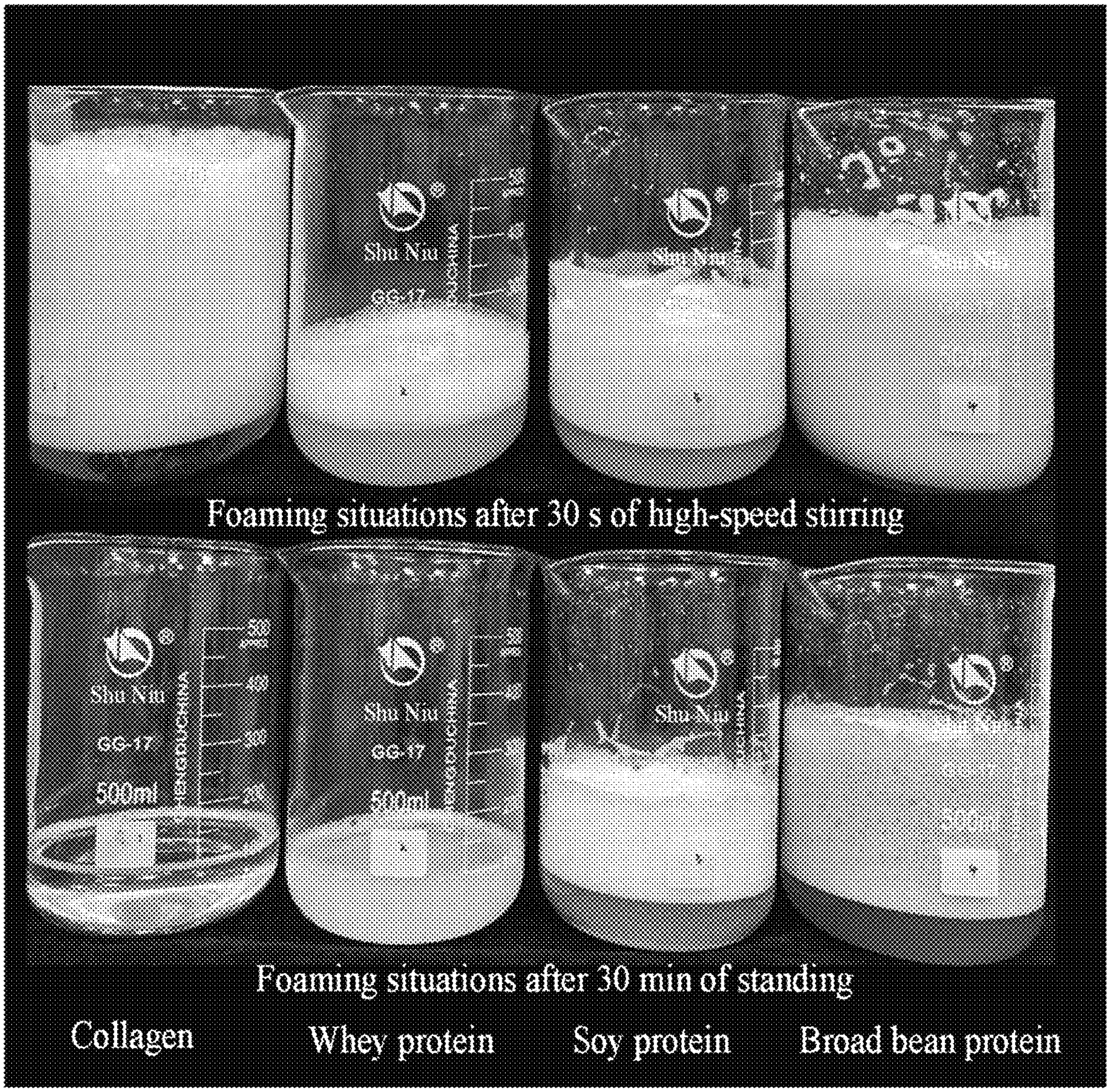
FIG. 2 shows foaming situations of four foaming agents, where the upper row of samples shows foaming situations after 30 seconds of high-speed stirring, and the lower row of samples shows foaming situations after 30 minutes of standing; and collagen, whey protein, soy protein, and broad bean protein are shown sequentially from left to right.
Figure 3:
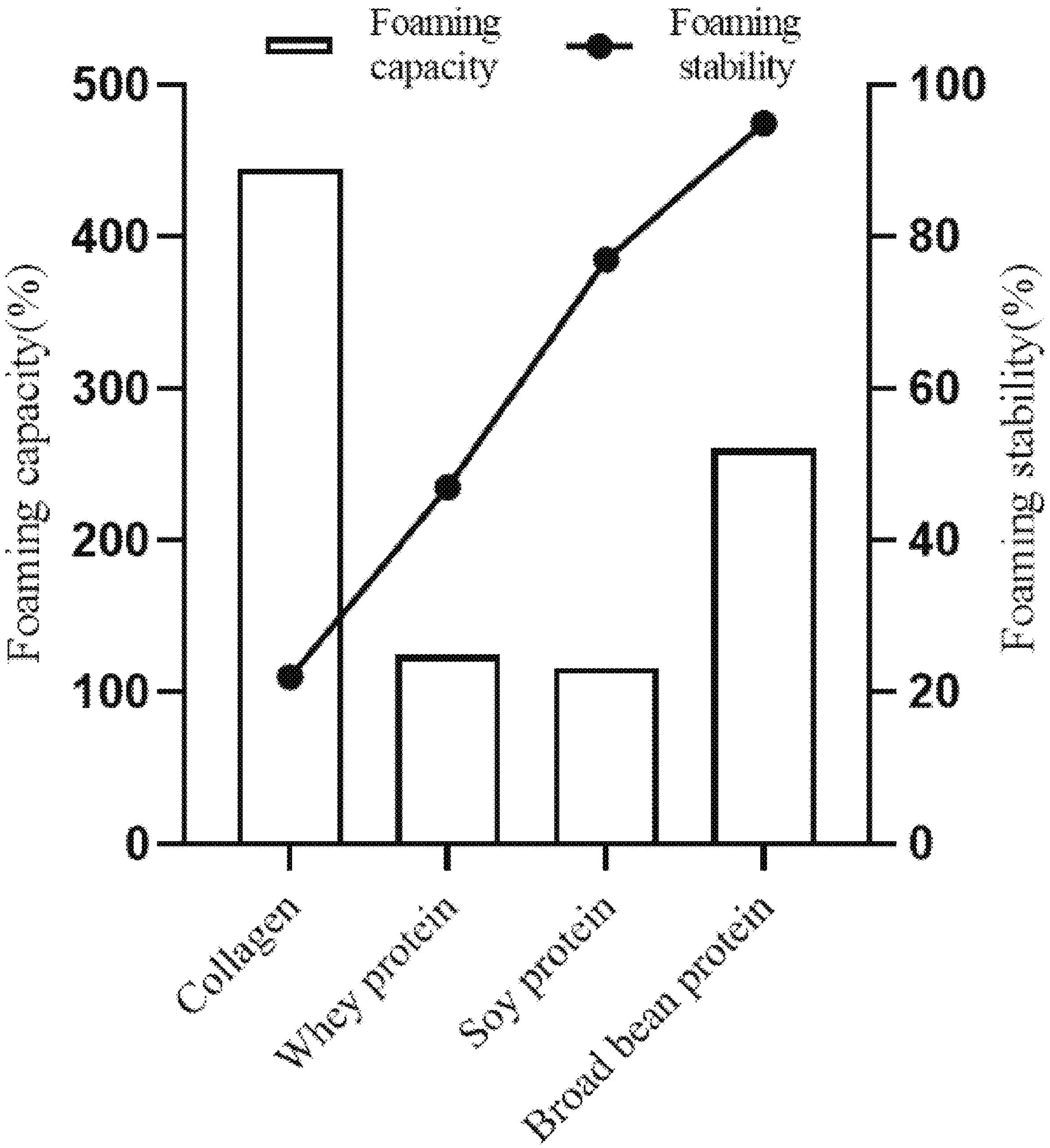
FIG. 3 shows foaming capacity and foaming stability of four foaming agents.

2) Selection of foaming agents: In a comparative experiment, four eco-friendly food foaming agents were selected: a collagen, a whey protein, a soy protein, and a broad bean protein. In this experiment, a foaming agent was used at a concentration of 2 wt %. Each foaming agent was added to 100 mL of purified water and stirred for 30 s to allow foaming, and a foaming capacity was measured. Results are shown in the upper row of samples of FIG. 2. To study the foaming stability, the four foaming agents were each allowed to stand for 30 minutes after completing the foaming. Results of the foaming stability are shown in the lower row of samples of FIG. 2. Through the comparative analysis of the data in FIG. 2 and FIG. 3, it was found that the collagen exhibits the highest foaming capacity, followed by the broad bean protein. However, a foam produced by the collagen has some drawbacks, such as large bubble size, high porosity, low density, and poor stability. In contrast, a foam produced by the broad bean protein involves small and fine bubbles with significantly-enhanced stability. Considering both the foaming capacity and the foaming stability as two key factors, the broad bean protein was identified as the optimal eco-friendly food foaming agent for producing the foamed hydrogel. This selection not only ensured the environmental friendliness of the product, but also guaranteed the stability of a foaming effect.

3) Determination of the optimal formula for the foamed hydrogel: Experimental design: The corn starch, sodium alginate, broad bean protein, and calcium carbonate were selected as four influencing factors. An orthogonal experimental design was conducted as follows. In the sodium alginate-starch mixed solution, a concentration of the corn starch was set to 120 g/L, 140 g/L, and 160 g/L, and a concentration of the sodium alginate was set to 22.5 g/L, 25 g/L, and 27.5 g/L. A concentration of the broad bean protein solution was set to 40 g/L, 60 g/L, and 80 g/L. A concentration of the calcium carbonate in the hydrogel was set to 10 g/L, 11 g/L, and 12 g/L. Details were shown in Table 1. An orthogonal experiment was conducted with a gel strength of a prepared foamed hydrogel as an evaluation index. Results were shown in Table 2.

TABLE 1

Orthogonal experimental design

| Level | A Corn starch (g/L) | B Sodium alginate (g/L) | C Broad bean protein (g/L) | D Calcium carbonate (g/L) |
|---|---|---|---|---|
| 1 | 120 | 22.5 | 40 | 10 |
| 2 | 140 | 25 | 50 | 11 |
| 3 | 160 | 27.5 | 60 | 12 |

TABLE 2

Orthogonal experimental results and analysis thereof

| Experiment No. | A | B | C | D | Gel strength/g |
|---|---|---|---|---|---|
| 1 | 1 | 1 | 1 | 1 | 92.68 |
| 2 | 1 | 2 | 2 | 2 | 97.36 |

TABLE 2-continued

Orthogonal experimental results and analysis thereof

| Experiment No. | A | B | C | D | Gel strength/g |
|---|---|---|---|---|---|
| 3 | 1 | 3 | 3 | 3 | 101.98 |
| 4 | 2 | 1 | 2 | 3 | 106.98 |
| 5 | 2 | 2 | 3 | 1 | 122.15 |
| 6 | 2 | 3 | 1 | 2 | 110.96 |
| 7 | 3 | 1 | 3 | 2 | 105.32 |
| 8 | 3 | 2 | 1 | 3 | 106.63 |
| 9 | 3 | 3 | 2 | 1 | 108.65 |
| $k_1$ | 97.34 | 101.59 | 103.42 | 107.82 | |
| $k_2$ | 113.29 | 108.71 | 104.26 | 104.54 | |
| $k_3$ | 106.86 | 107.19 | 109.81 | 105.13 | |
| Range (R) | 15.95 | 7.12 | 6.39 | 3.28 | |
| Optimal solution | $A_2$ | $B_2$ | $C_3$ | $D_1$ | |

According to the range analysis in Table 2, $R_A>R_B>R_C>R_D$, corresponding to corn starch>sodium alginate>broad bean protein>calcium carbonate in terms of a significance level. That is, the content of the corn starch has the highest influence on the gel strength of the foamed hydrogel, the content of the sodium alginate has a medium influence on the gel strength of the foamed hydrogel, the concentration of the broad bean protein has a minor influence on the gel strength of the foamed hydrogel, and the concentration of the calcium carbonate has the lowest influence on the gel strength of the foamed hydrogel. Therefore, the optimal solution is $A_2B_2C_3D_1$: the corn starch: 140 g/L, the sodium alginate: 25 g/L, the broad bean protein: 60 g/L, and the calcium carbonate: 10 g/L. The foamed hydrogels prepared based on the above formulas have a gel strength of 92.68/g to 122.15/g, and all exhibit a sufficient strength (a gel strength of 85 g for a foamed hydrogel is set as the minimum gel strength requirement for outer packaging materials of honey peaches) to meet the protection requirement of packaging materials for honey peaches in the following use examples.

3. Use Examples: A broad bean protein and starch-based foamed hydrogel prepared according to the optimal solution in Example 1 was poured into a mold, allowed to stand for 5 hours, and then demolded to produce a vibration-damping packaging. The vibration-damping packaging was used in the logistics of honey peaches to verify a vibration-damping effect of the vibration-damping packaging.

Figure 4:
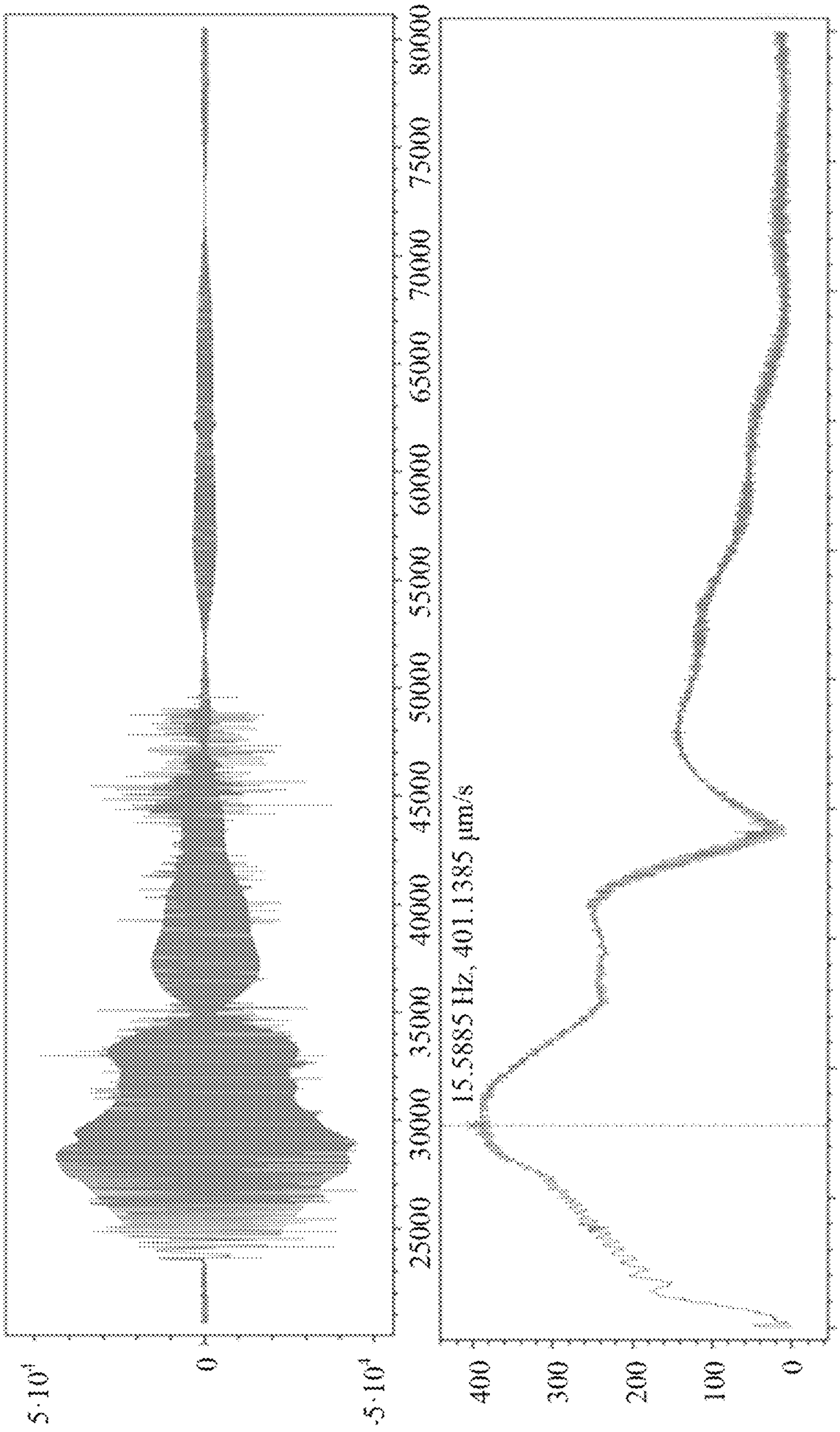
FIG. 4 is a power spectral density (PSD) diagram of a simulated logistics random vibration for honey peaches.
Figure 5A:
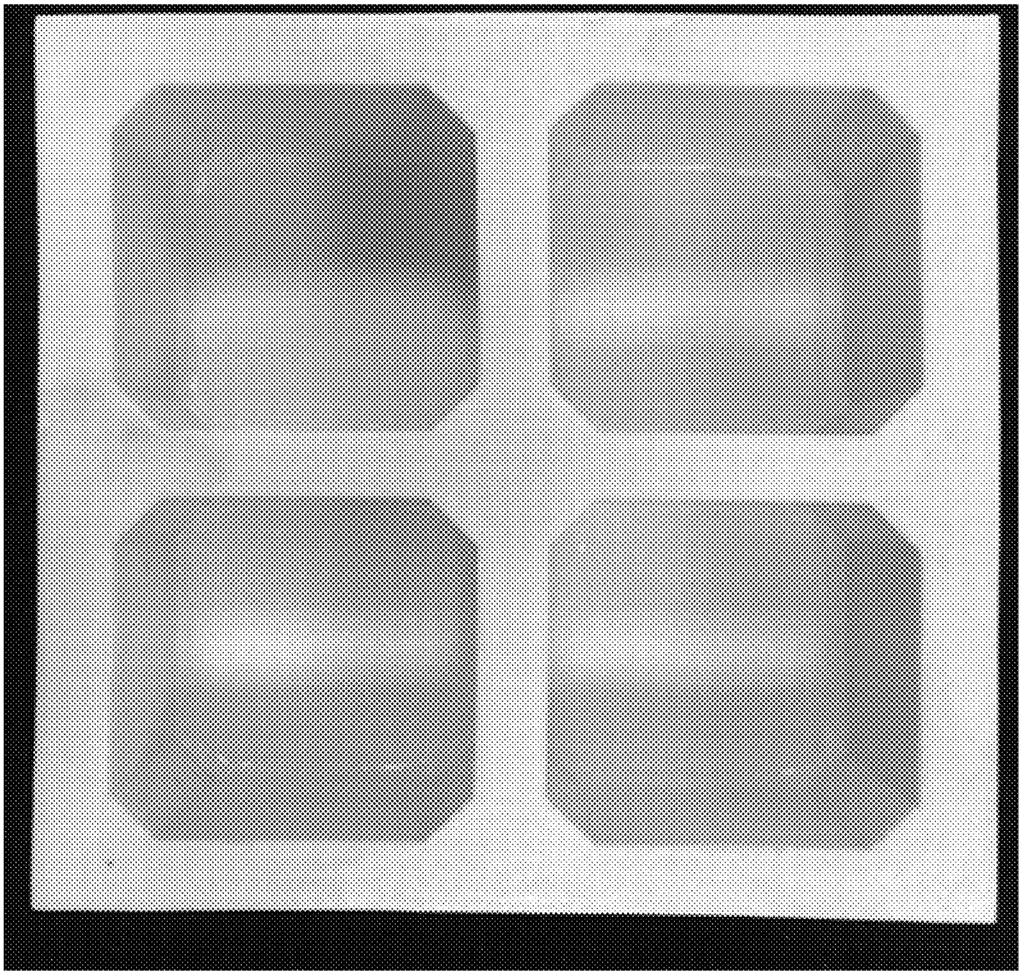
FIG. 5A to FIG. 5B show images of broad bean protein and starch-based foamed hydrogel samples, where
Figure 5B:
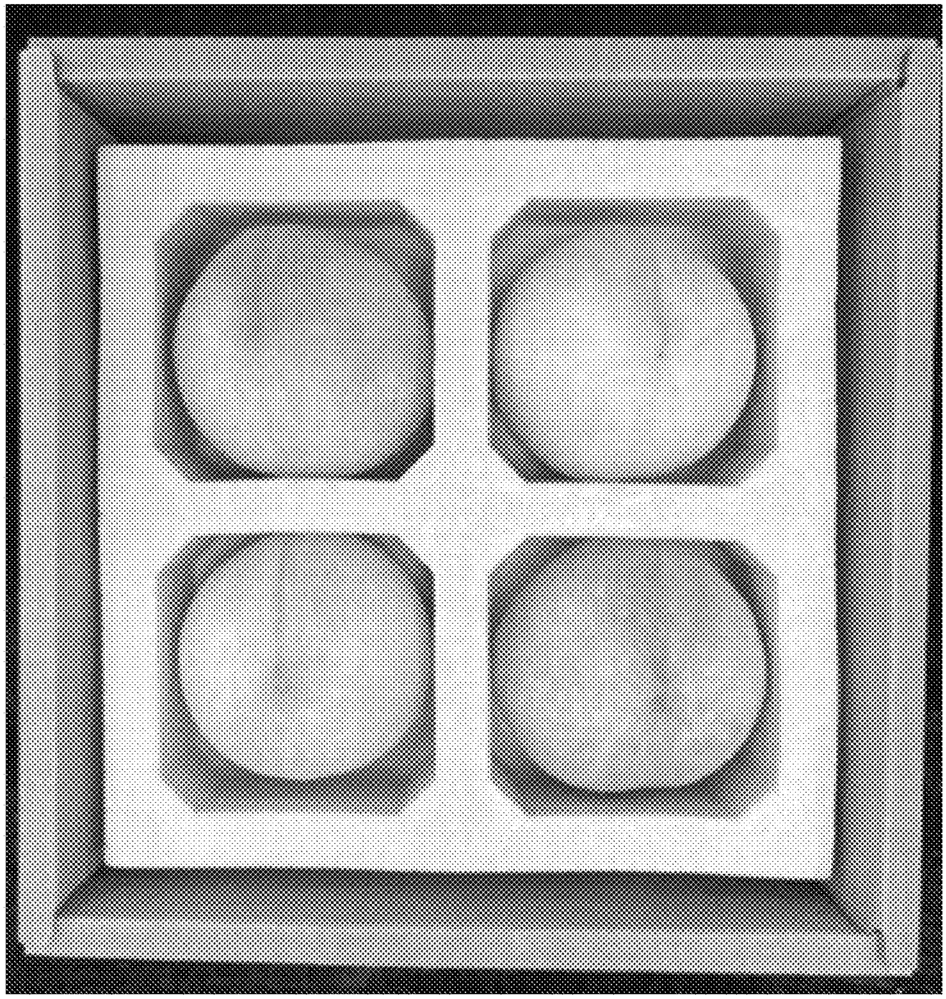

1) Simulated logistics random vibration test: Commercial mature honey peaches were selected and divided into the following three groups: a non-vibration group, an expanded polyethylene foam packaging+vibration group, and a broad bean protein and starch-based foamed hydrogel packaging+vibration group. In the vibration groups, a same packaging manner was adopted, and honey peaches were transported to a laboratory in a pre-cooled state, then taken out and placed at room temperature for 30 minutes, and then placed on a vibration platform. According to the simulated transportation random vibration results shown in FIG. 4, a simulated transportation constant-frequency vibration was conducted at a frequency of 15.5 Hz and an amplitude of 0.4 mm. There were 8 honey peaches in each group and 4 honey peaches in each packaging, as shown in FIG. 5A to FIG. 5B.

The vibration-induced damage to the fruits was observed and recorded, and an ethylene release level of the fruits was determined. As honey peaches are climacteric fruits, the vibration-induced damage will enhance the respiratory metabolism of a damaged tissue, leading to increased ethylene production. Therefore, an ethylene release level of a honey peach can be measured to reflect a damage degree of the honey peach.

Figure 6:
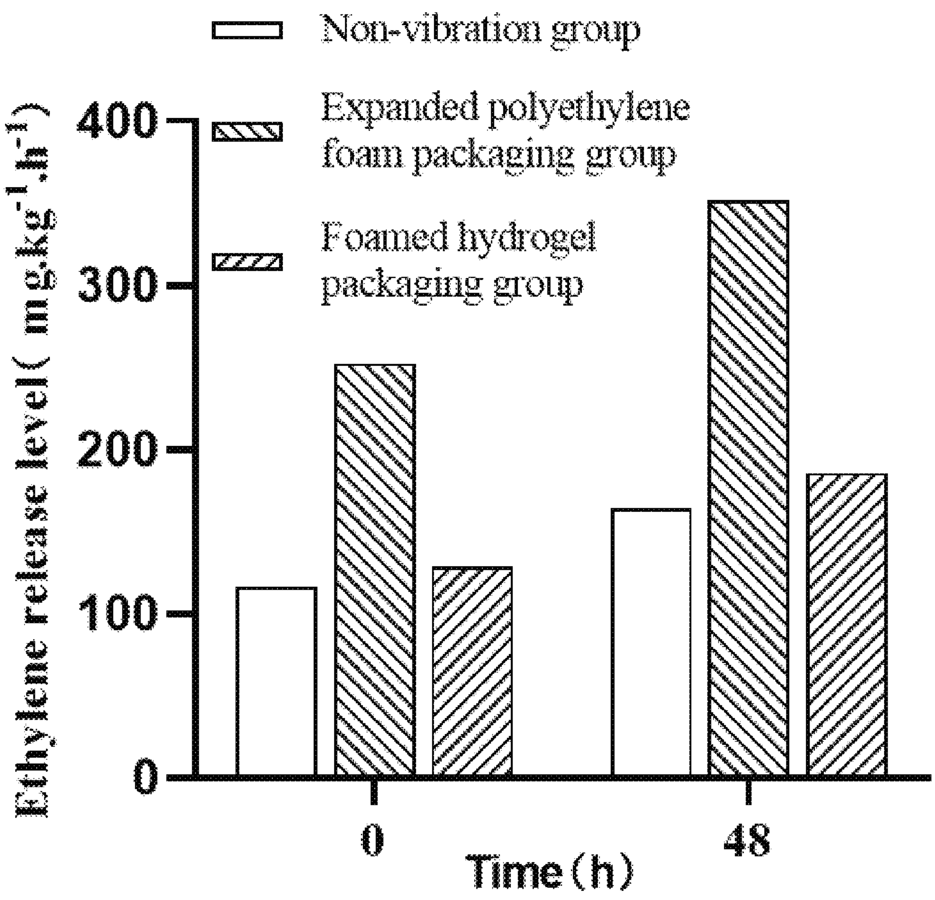
FIG. 6 shows ethylene release levels of honey peaches packaged with different materials after a simulated logistics vibration.

As shown in FIG. 6, after the simulated logistics vibration, ethylene release levels of commercial mature honey peaches in the non-vibration group at 0 h and 48 h are 116.86 $mg\cdot kg^{-1}\cdot h^{-1}$ and 164.16 $mg\cdot kg^{-1}\cdot h^{-1}$, respectively, ethylene release levels of commercial mature honey peaches in the foamed hydrogel group at 0 h and 48 h are 128.79 $mg\cdot kg^{-1}\cdot h^{-1}$ and 186.68 $mg\cdot kg^{-1}\cdot h^{-1}$, respectively, and ethylene release levels of commercial mature honey peaches in the expanded polyethylene foam group at 0 h and 48 h are 252.06 $mg\cdot kg^{-1}\cdot h^{-1}$ and 352.18 $mg\cdot kg^{-1}\cdot h^{-1}$, respectively. It can be known that, at 0 h and 48 h after the vibration, ethylene release levels in the expanded polyethylene foam group are both higher than respective ethylene release levels in the foamed hydrogel group and the non-vibration group, and ethylene release levels in the foamed hydrogel group are merely slightly higher than respective ethylene release levels in the non-vibration group. During the simulated vibration, the vibration-damping packaging prepared from the broad bean protein and starch-based foamed hydrogel plays a significant protective role for honey peaches.

Figure 7A:
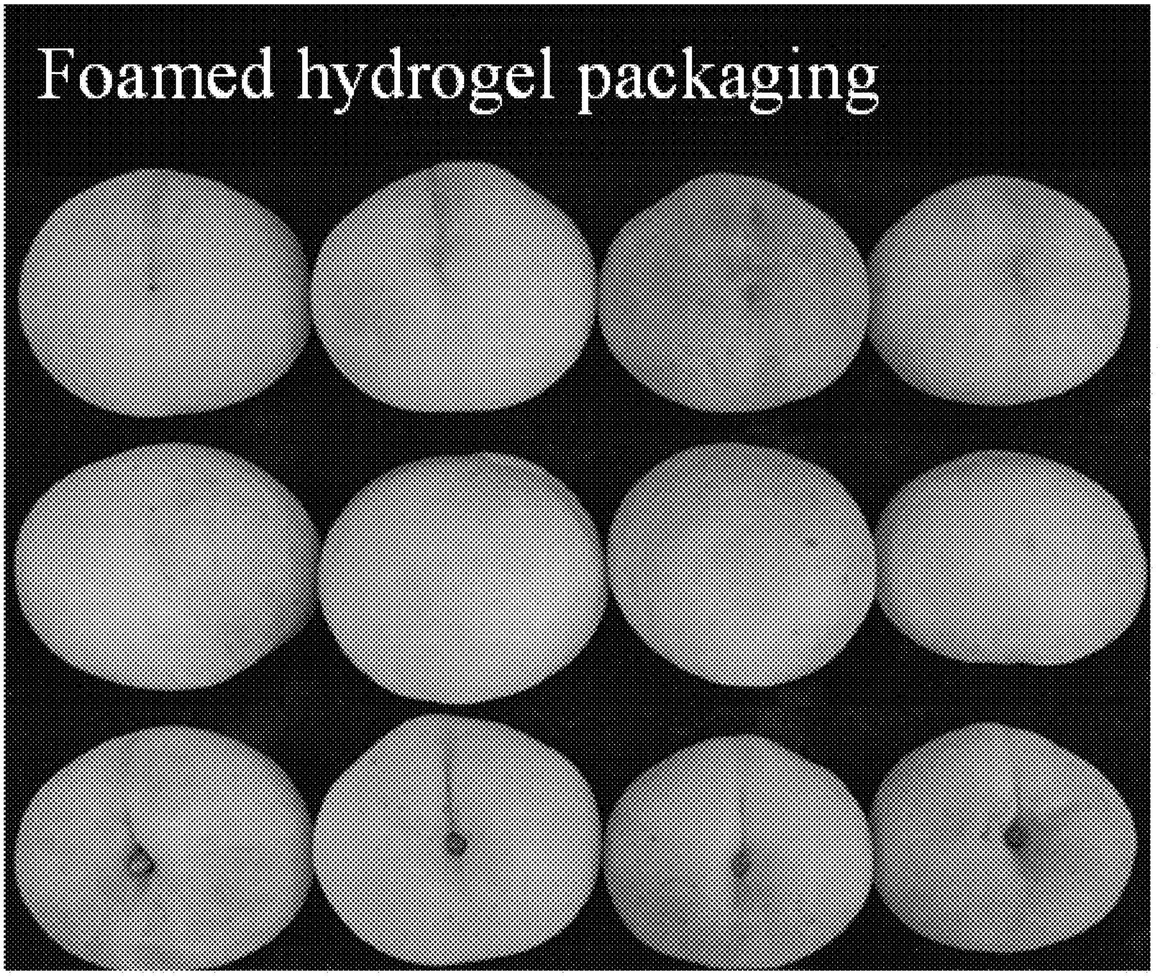
FIG. 7A to FIG. 7B show surface damages of honey peaches packaged with different materials after a simulated logistics vibration, where
Figure 7B:
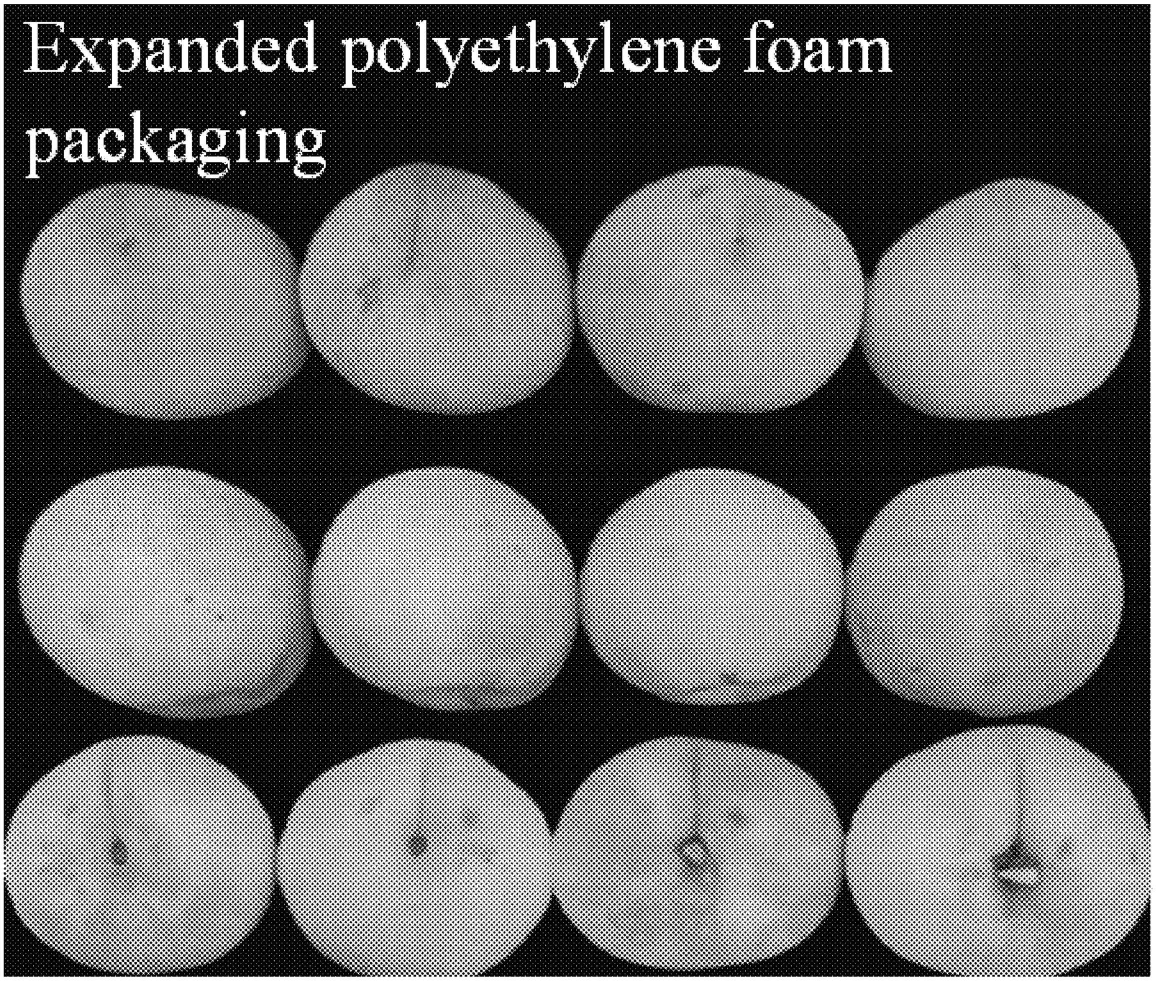

According to FIG. 7B, after the logistics transportation, honey peaches packaged with the expanded polyethylene foam undergo skin and flesh browning due to specified frictional damage of a top, a bottom, and protruding parts at two sides. According to FIG. 7A, after the logistics transportation, surfaces of honey peaches packaged with the broad bean protein and starch-based foamed hydrogel undergo no obvious frictional damage-induced browning. It can intuitively indicate that the vibration-damping packaging prepared from the broad bean protein and starch-based foamed hydrogel provides a better protective effect for honey peaches than the traditional expanded polyethylene foam packaging during a logistics process.

2) Logistics test: Commercial mature honey peaches were selected and placed in a broad bean protein and starch-based foamed hydrogel packaging and an expanded polyethylene foam packaging to set two experimental groups. The two experimental groups were sent out simultaneously by a courier company. All packages were delivered under fresh produce transportation standards according to road-transportation. After 2 days of transportation, the packages were stored for 2 days. The two experimental groups were then subjected to the same simulated vibration test as above.

Figure 8:
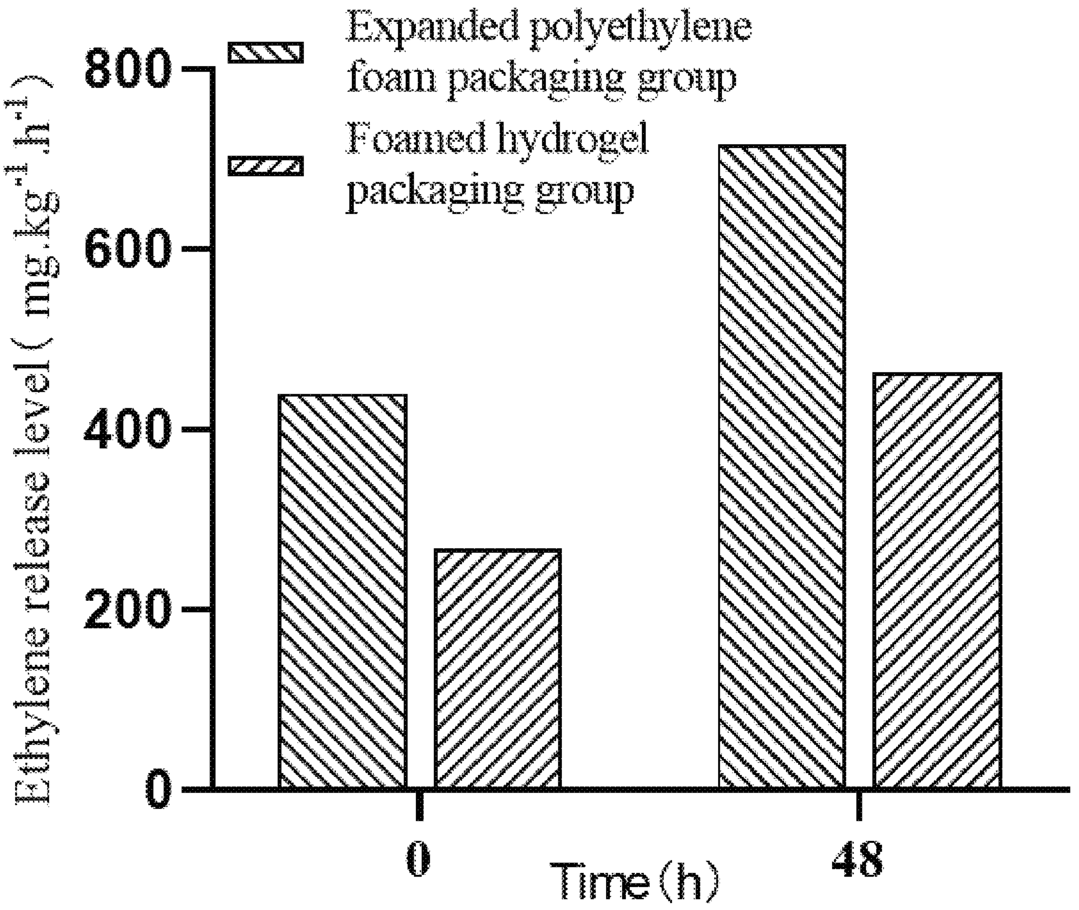
FIG. 8 shows ethylene release levels of honey peaches packaged with different materials after logistics transportation.

As shown in FIG. 8, after 2 days of logistics transportation, an ethylene release level in the expanded polyethylene foam group is 440.48 $mg\cdot kg^{-1}\cdot h^{-1}$, and an ethylene release level in the foamed hydrogel group is only 267.42 $mg\cdot kg^{-1}\cdot h^{-1}$. After 2 days of storage, an ethylene release level in the expanded polyethylene foam group is 717.22 $mg\cdot kg^{-1}\cdot h^{-1}$, and an ethylene release level in the foamed hydrogel group is only 453.36 $mg\cdot kg^{-1}\cdot h^{-1}$. It can be known that the foamed hydrogel packaging can provide a better protective effect for honey peaches than the expanded polyethylene foam packaging during a logistics process.

Figure 9A:
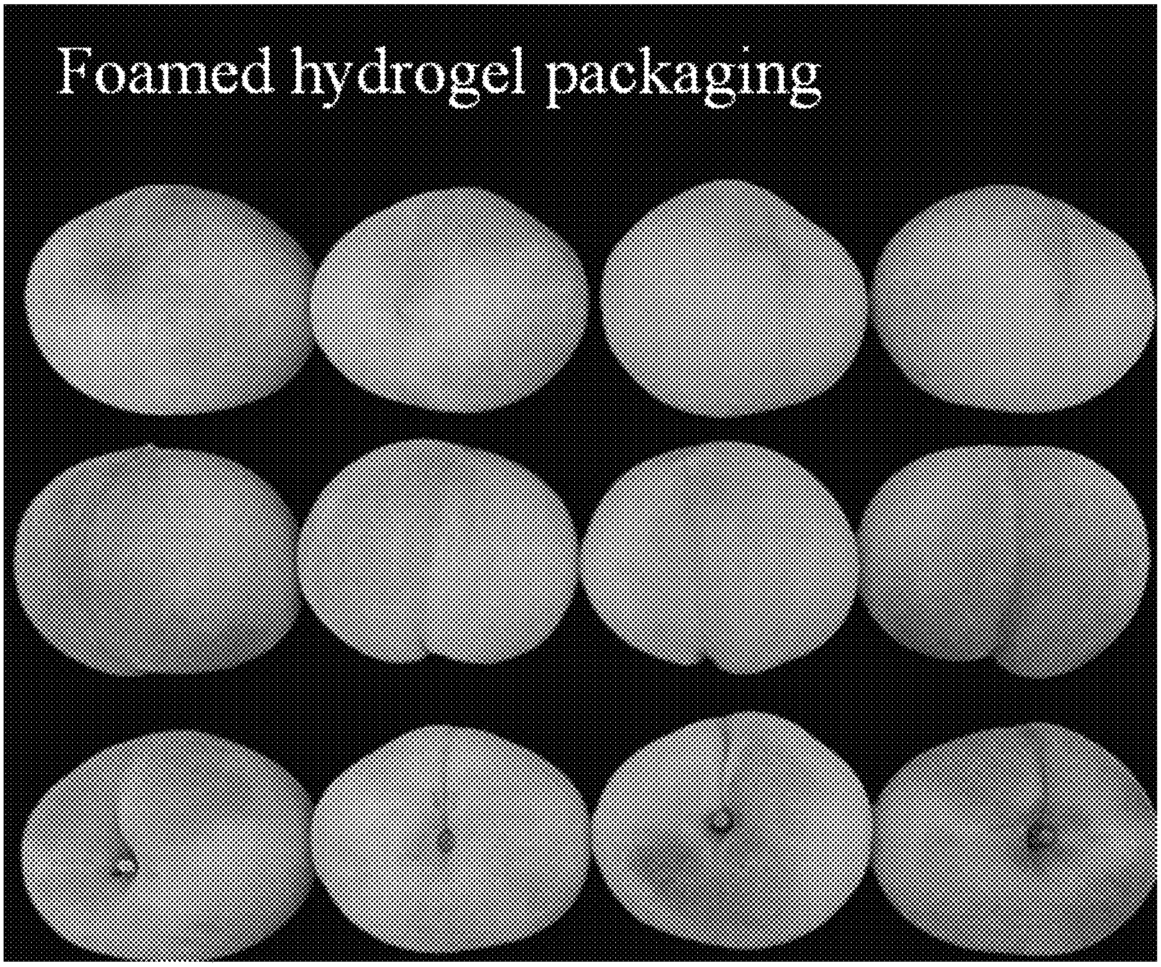
FIG. 9A to FIG. 9B show surface damages of honey peaches packaged with different materials after a logistics vibration, where
Figure 9B:
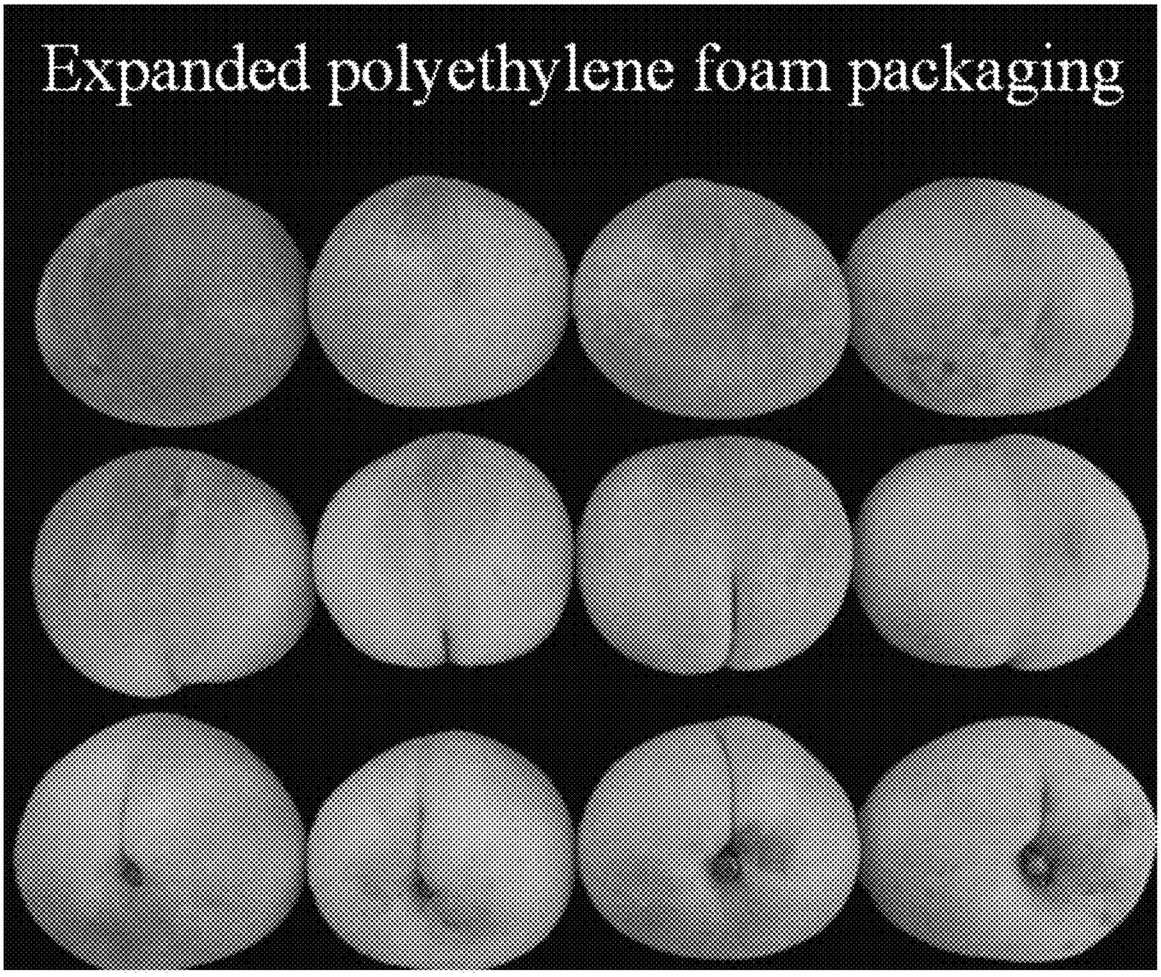

According to FIG. 9B, after the logistics transportation, honey peaches packaged with the expanded polyethylene foam undergo skin and flesh browning due to specified mechanical damage of a top, a bottom, and protruding parts at two sides. According to FIG. 9A, after the logistics transportation, surfaces of honey peaches packaged with the broad bean protein and starch-based foamed hydrogel undergo no obvious mechanical damage-induced browning.

It can intuitively indicate that the vibration-damping packaging prepared from the broad bean protein and starch-based foamed hydrogel provides a better protective effect for honey peaches than the traditional expanded polyethylene foam packaging during a logistics process.

3) Drop test: Commercial mature honey peaches were selected and placed in a broad bean protein and starch-based foamed hydrogel packaging and an expanded polyethylene foam packaging to set two experimental groups, and a control group was set. That is, there were three groups in total. The foamed hydrogel group and the expanded polyethylene foam group were allowed to freely fall from a height of 1 m simultaneously. The free falling was repeated five times. The honey peaches were then taken out, observed, and stored for 2 days. Each group was subjected to the same simulated vibration test as above.

Figure 10:
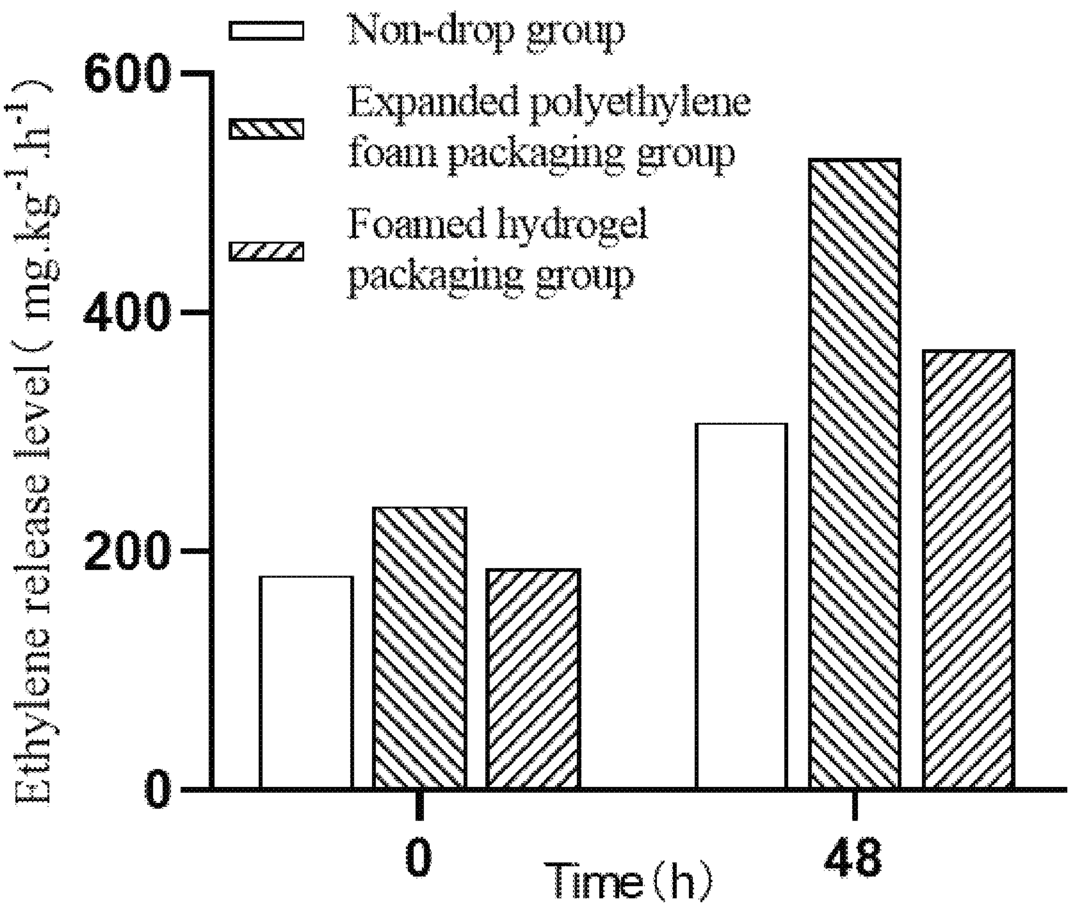
FIG. 10 shows ethylene release levels of honey peaches packaged with different materials after a drop test.

As shown in FIG. 10, ethylene release levels in the non-drop group at 0 h and 48 h are 180.26 $mg\cdot kg^{-1}\cdot h^{-1}$ and 308.56 $mg\cdot kg^{-1}\cdot h^{-1}$, respectively, ethylene release levels in the foamed hydrogel group at 0 h and 48 h are 180.11 $mg\cdot kg^{-1}\cdot h^{-1}$ and 369.48 $mg\cdot kg^{-1}\cdot h^{-1}$, respectively, and ethylene release levels in the expanded polyethylene foam group at 0 h and 48 h are 238.51 $mg\cdot kg^{-1}\cdot h^{-1}$ and 592.44 $mg\cdot kg^{-1}\cdot h^{-1}$, respectively. It can be known that, at 0 h and 48 h after the vibration, ethylene release levels in the expanded polyethylene foam group are both higher than respective ethylene release levels in the foamed hydrogel group and the non-drop group, and ethylene release levels in the foamed hydrogel group are merely slightly higher than respective ethylene release levels in the non-drop group. During the drop test, the vibration-damping packaging prepared from the broad bean protein and starch-based foamed hydrogel plays a significant protective role for honey peaches.

Figure 11A:
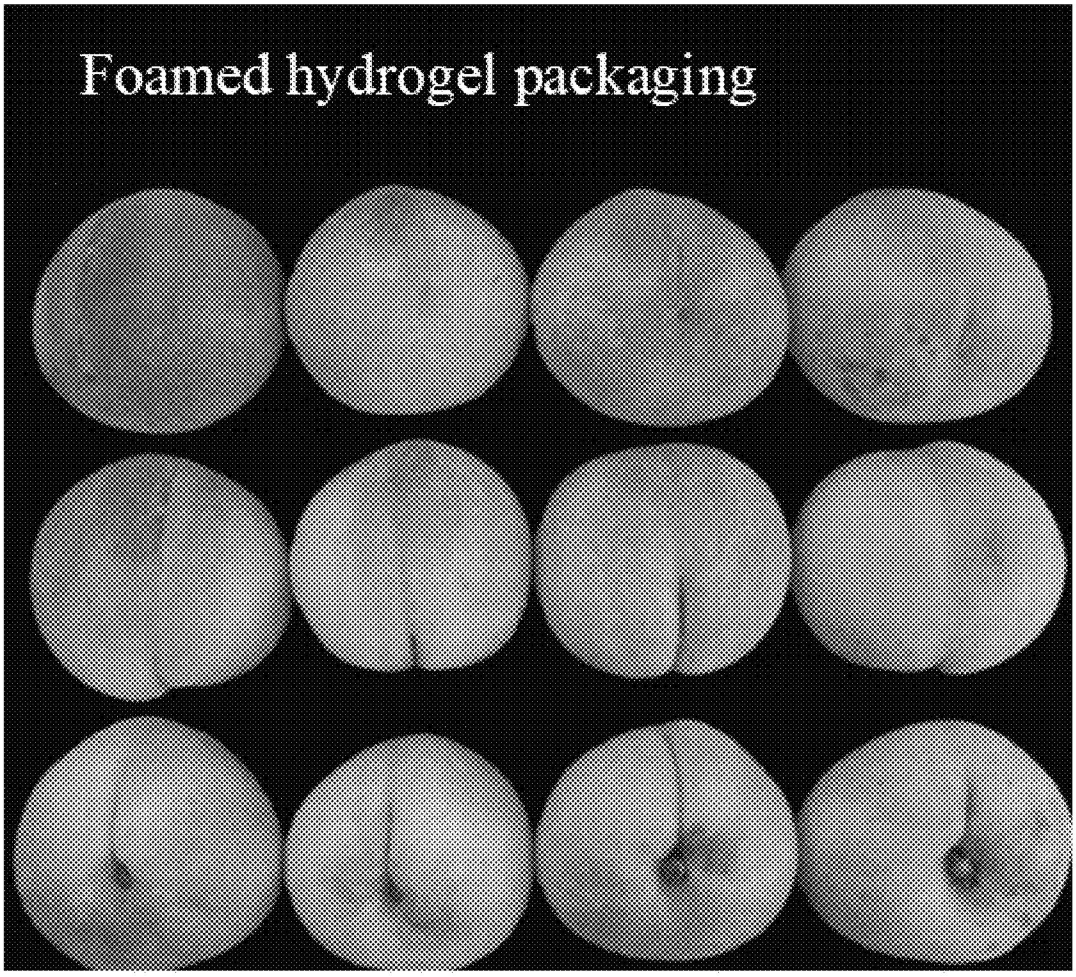
FIG. 11A to FIG. 11B show surface damages of honey peaches packaged with different materials after a drop test, where
Figure 11B:
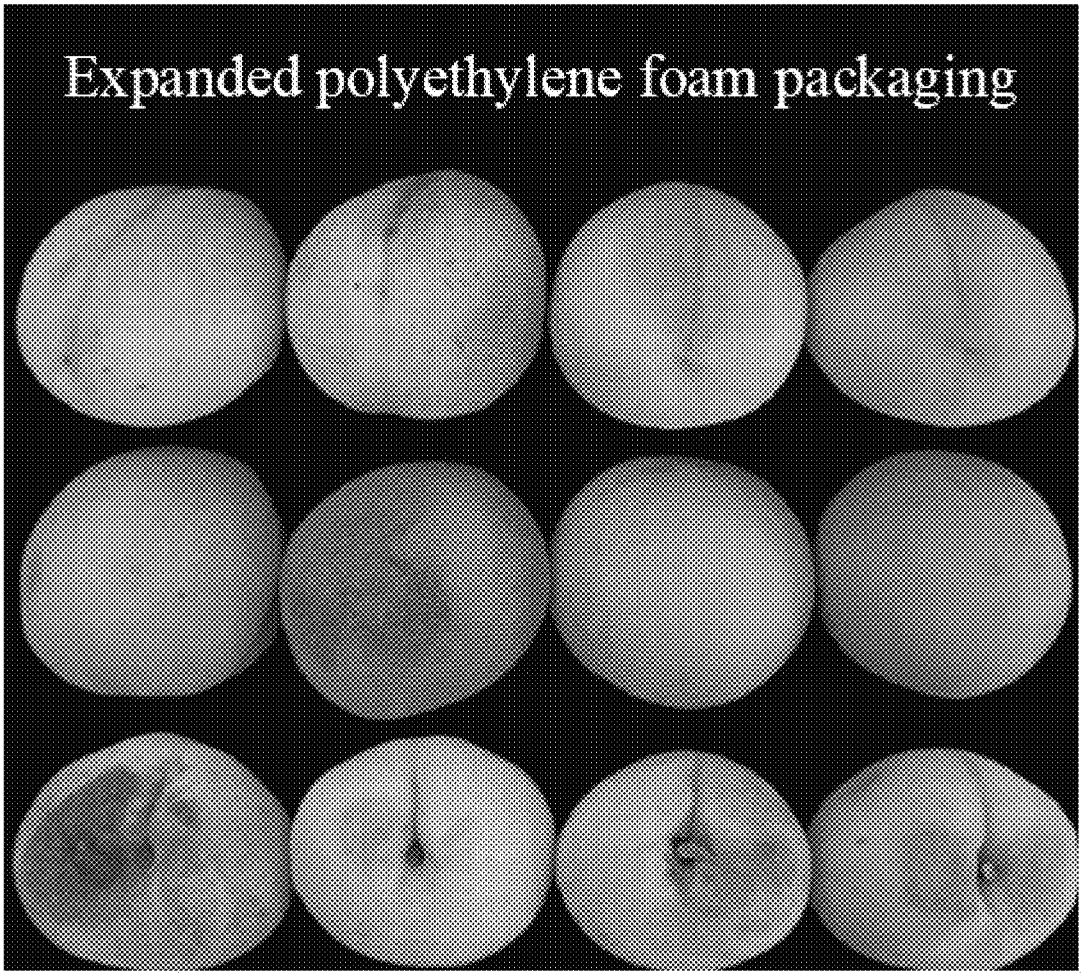

According to FIG. 11B, after the drop test, honey peaches packaged with the expanded polyethylene foam undergo skin and flesh browning due to specified mechanical damage of a top, a bottom, and protruding parts at two sides. According to FIG. 11A, after the drop test, surfaces of honey peaches packaged with the broad bean protein and starch-based foamed hydrogel undergo no obvious mechanical damage-induced browning. It can intuitively indicate that the vibration-damping packaging prepared from the broad bean protein and starch-based foamed hydrogel provides a better protective effect for honey peaches than the traditional expanded polyethylene foam packaging.

4) Cold-retaining test: Commercial mature honey peaches were selected and divided into a non-packaging group, a broad bean protein and starch-based foamed hydrogel packaging group, and an expanded polyethylene foam packaging group. Peaches in the three groups were each pre-cooled in a 0° C. cold storage for 12 h, and then statically placed at 35° C. (a simulated high-temperature of summer environment in many parts of China) for 8 h. A temperature was recorded every 2 h.

Figure 12:
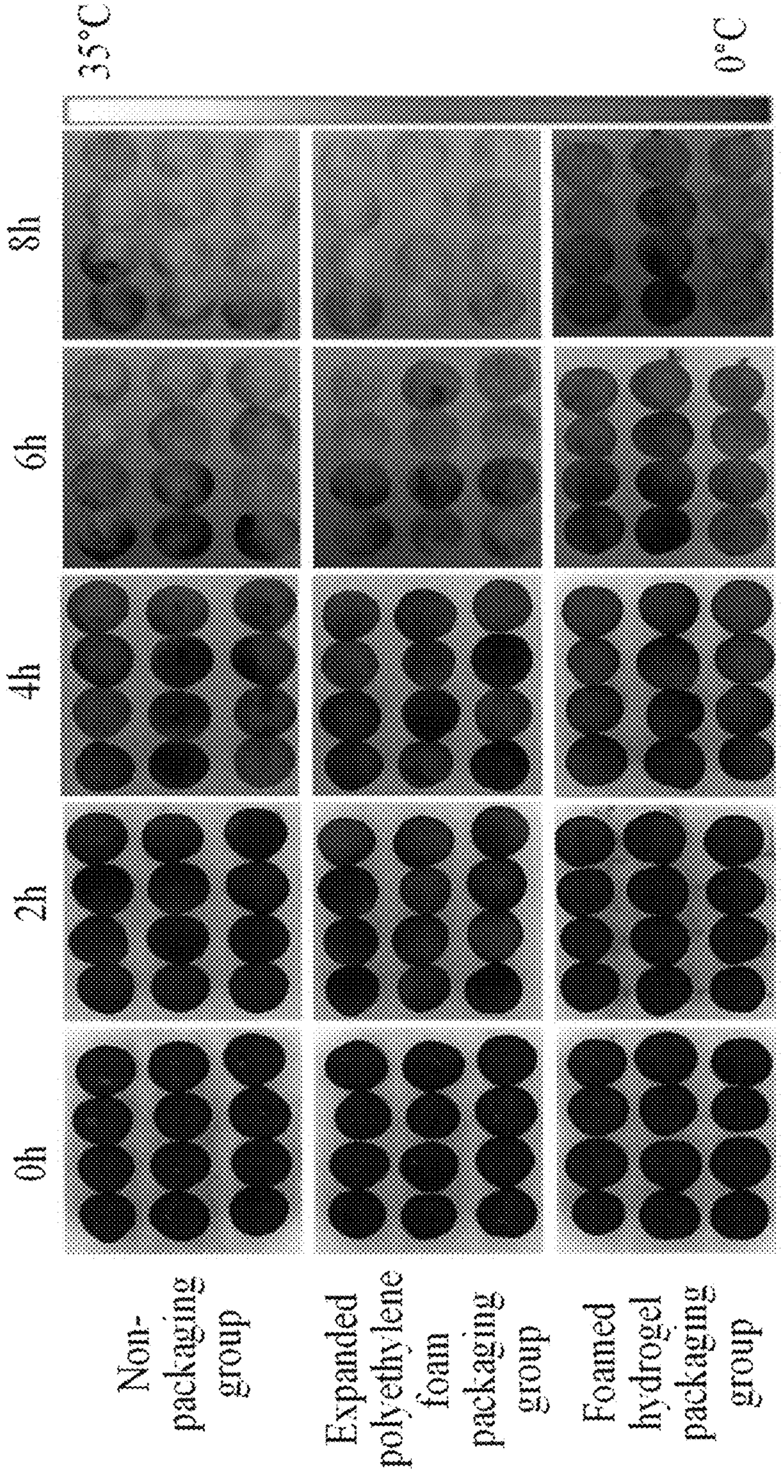
FIG. 12 shows thermal imaging results of temperature changes of honey peaches packaged with different materials at 35° C.
Figure 13:
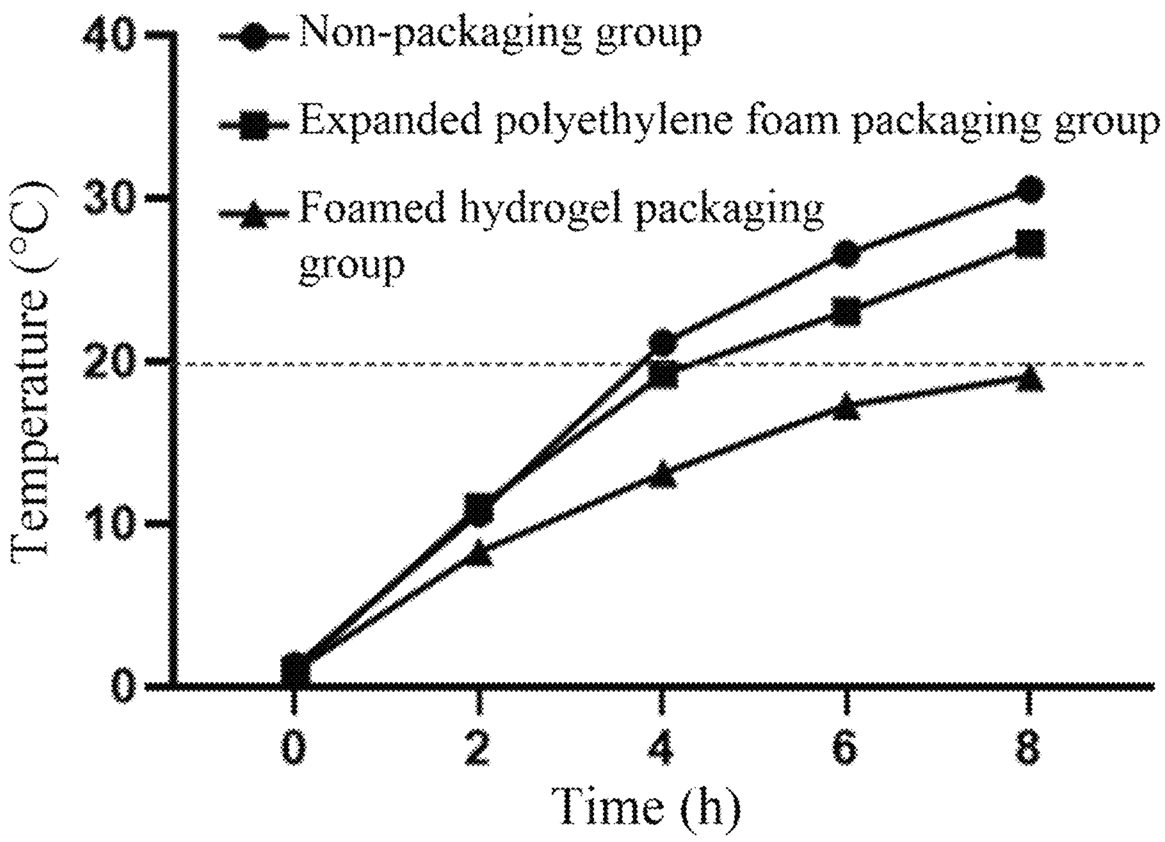
FIG. 13 shows temperature changes of honey peaches packaged with different materials.

As shown in FIG. 12 and FIG. 13, under the same initial temperature and the consistent environmental conditions, the rise of a temperature of a fruit to 20° C. is achieved within 4 h in the non-packaging group, and is also achieved within 4 h in the expanded polyethylene foam packaging group. In contrast, the foamed hydrogel packaging group takes 8 h to achieve the same temperature rise. These results intuitively show that the foamed hydrogel packaging has excellent cold-retaining performance, and can still maintain a long-lasting low-temperature-holding function even after being removed from cold-chain transportation. During the transportation and delivery, the maintenance of a low internal temperature for fruits and vegetables in packaging materials can effectively address the "last-mile" challenge in cold-chain transportation, and ensures both the transport quality of fruits and vegetables and the satisfaction of consumers.

5) Biodegradation experiment: Three tests were conducted for the foamed hydrogel material. In a first group, a foamed hydrogel sample was added to a trypsin digestion solution. In a second group, a foamed hydrogel sample was added to phosphate buffered saline as a control group. In a third group, a foamed hydrogel sample was buried in a soil as a biodegradation group. The samples in the first and second groups were each thoroughly shaken for 8 days at 180 rpm and 37° C. During this experiment, a sample was collected from each group every 2 days, and a mass of the residual foamed hydrogel was measured.

Figure 14:
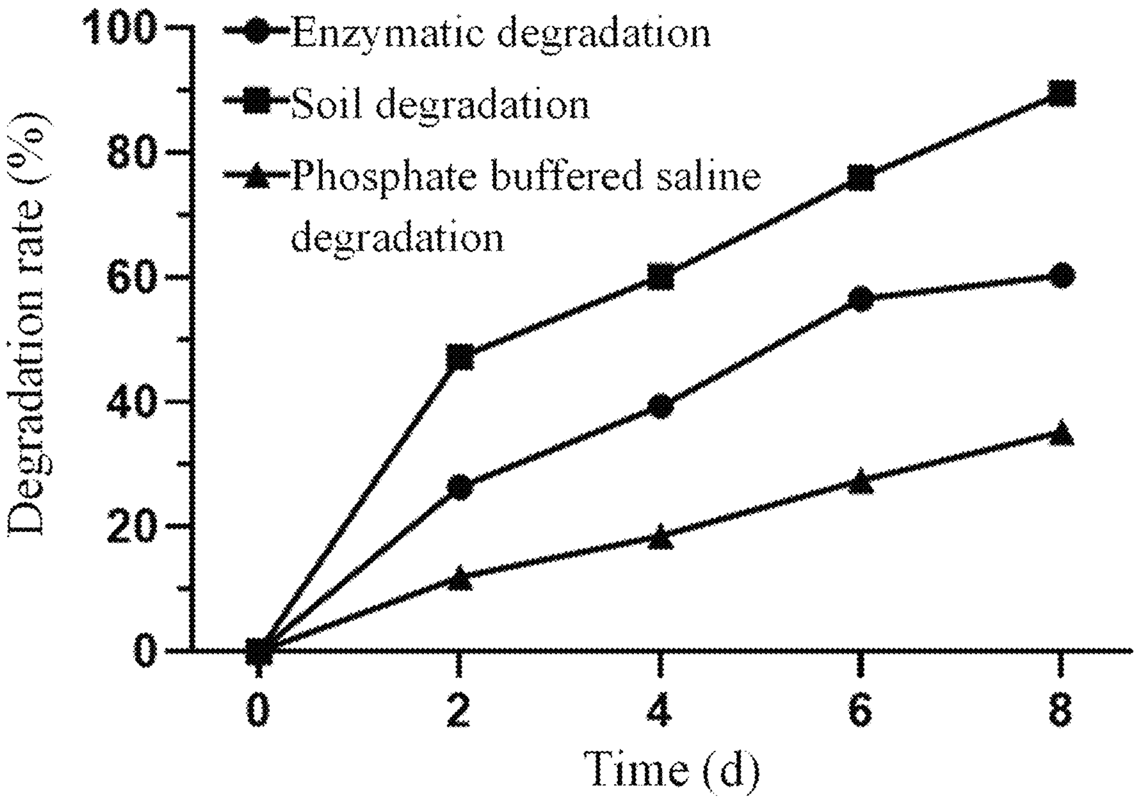
FIG. 14 shows degradation rates of a foamed hydrogel packaging under different conditions within 8 days.

As shown in FIG. 14, the foamed hydrogel, as a biodegradable material, is rapidly degraded by 60% to 80% or more within 8 days in both the enzymatic hydrolysis and soil degradation tests. These results clearly demonstrate that the foamed hydrogel not only exhibits excellent biocompatibility, but also serves as an eco-friendly packaging material.

The above description does not limit the present disclosure, and the present disclosure is not limited to the above examples. Variations, modifications, additions, or replacements made by those of ordinary skill in the art within the substantial scope of the present disclosure should also fall within the protection scope of the present disclosure.

What is claimed is:

1. A preparation method of a broad bean protein and starch-based foamed hydrogel, comprising the following steps: stirring a broad bean protein solution with a concentration of 40 g/L to 60 g/L until foaming; under stirring, adding a sodium alginate-starch mixed solution in a volume of twice a volume of the broad bean protein solution, followed by stirring until homogeneous; and adding calcium carbonate until a final concentration of the calcium carbonate reaches 10 g/L to 12 g/L, and further stirring thoroughly to obtain the broad bean protein and starch-based foamed hydrogel, wherein in the sodium alginate-starch mixed solution, a concentration of sodium alginate is 22.5 g/L to 27.5 g/L and a concentration of corn starch is 120 g/L to 160 g/L, and wherein:

the broad bean protein solution is prepared by dissolving a broad bean protein in purified water, performing an ultrasonic treatment for 5 minutes to 15 minutes, and adding gluconolactone in a proportion of 2.5% to 3% based on a mass of the purified water, to obtain the broad bean protein solution with the concentration of 40 g/L to 60 g/L; and the sodium alginate-starch mixed solution is prepared by dissolving the sodium alginate in purified water to produce a sodium alginate aqueous solution, adding the corn starch to the sodium alginate aqueous solution and mixing thoroughly, and heating in a water bath at 55° C. to 60° C. under stirring for 25 minutes to 35 minutes to obtain the sodium alginate-starch mixed solution.

2. The preparation method according to claim 1, wherein stirring the broad bean protein solution comprises stirring the broad bean protein solution with a concentration of 60 g/L until foaming, wherein adding the calcium carbonate comprises adding the calcium carbonate until the final concentration of the calcium carbonate reaches 10 g/L, and wherein in the sodium alginate-starch mixed solution, the concentration of the sodium alginate is 25 g/L and the concentration of the corn starch is 140 g/L.

3. The preparation method according to claim 1, further comprising: pouring the broad bean protein and starch-based foamed hydrogel into a mold, allowing the mold to stand for 5 hours, and demolding to obtain a vibration-damping packaging based on the broad bean protein and starch-based foamed hydrogel.

4. The preparation method according to claim 2, further comprising: pouring the broad bean protein and starch-based foamed hydrogel into a mold, allowing the mold to stand for 5 hours, and demolding to obtain a vibration-damping packaging based on the broad bean protein and starch-based foamed hydrogel.

* * * * *